June 11, 1963 F. G. WAGNER 3,093,349
DUCT ARRANGEMENT FOR AIRCRAFT BOUNDARY LAYER CONTROL
Filed July 29, 1960 2 Sheets-Sheet 1

INVENTOR.
FRED G. WAGNER
BY Knox & Knox

June 11, 1963  F. G. WAGNER  3,093,349
DUCT ARRANGEMENT FOR AIRCRAFT BOUNDARY LAYER CONTROL
Filed July 29, 1960  2 Sheets-Sheet 2
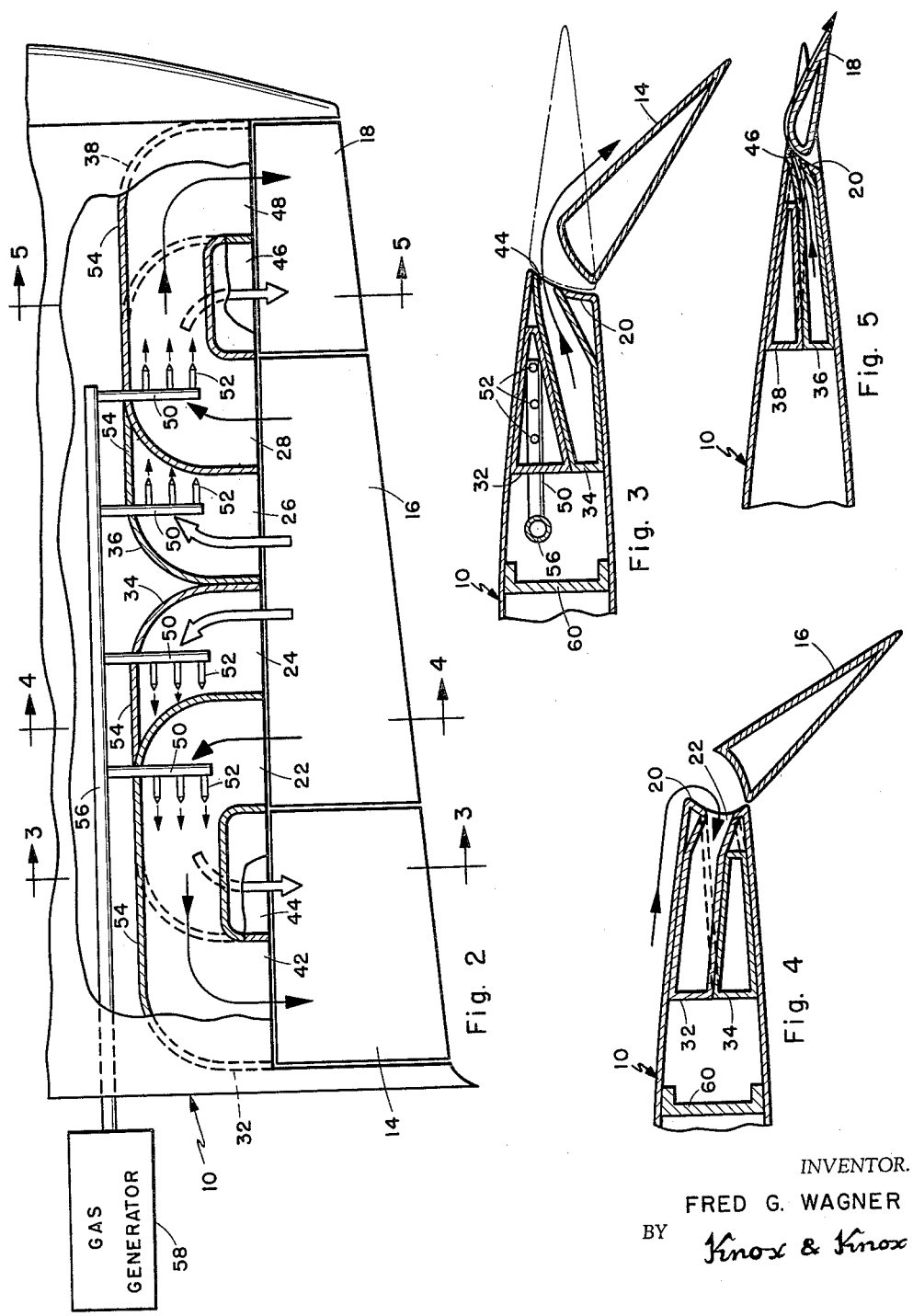
INVENTOR.
FRED G. WAGNER
BY Knox & Knox

3,093,349
DUCT ARRANGEMENT FOR AIRCRAFT BOUNDARY LAYER CONTROL

Fred G. Wagner, San Diego, Calif., assignor to The Ryan Aeronautical Co., San Diego, Calif.
Filed July 29, 1960, Ser. No. 46,178
7 Claims. (Cl. 244—42)

The present invention relates generally to aircraft and more particularly to a duct arrangement for aircraft boundary layer control.

Boundary layer control has been used on various types of aircraft to improve aerodynamic characteristics during different phases of flight, a primary use being to increase lift at low speeds and enable an aircraft to take off and land in minimum distances. Usually air is drawn in at some point on the aircraft and is blown rearwardly over the wing flaps, after being boosted by combustion, compression, or combination with additional gases from a gas generator of some type.

The configuration considered in the present disclosure is applied to the wings of an aircraft, in which air is drawn in through a suction slot along one portion of the wing adjacent the trailing edge, the air being boosted by jet pump action and ejected through blowing slots over wing flaps and ailerons. In installations of this type already tested the ducting arrangement is such that, in order to obtain an efficient jet pump structure, the air is subjected to 180 degree turns in short distances, with resultant losses in efficiency and the jet pump itself is unnecessarily complex. Or, the efficiency of the jet pump is reduced in order to obtain smooth airflow, losses being considerable in either case. The ideal structure is one in which the airflow is turned as little and as gradually as possible, bearing in mind that the flow must in any case be substantially reversed in the process, while the jet pump section of the duct system is of maximum possible length to increase efficiency.

The primary object of this invention, therefore, is to provide aircraft boundary layer control means in which air is drawn in through multiple ducts adjacent the wing trailing edges and, after boosting, is ejected through multiple outlets over the aerodynamic control surfaces, each duct being of considerable length and certain ducts being overlapped to obtain the required length in a minimum of total space.

Another object of this invention is to provide aircraft boundary layer control means in which each duct is provided with a jet pump utilizing the maximum possible length of the duct for efficiency.

Another object of this invention is to provide boundary layer control means which is compact and can be fitted into relatively thin aircraft wings without interfering with structural strength.

Still another object of this invention is to provide boundary layer control means which is adaptable to many different types of aircraft and control surface arrangements.

A further object of this invention is to provide boundary layer control means which, when not in use, does not interfere with normal control surface operation or affect aircraft performance.

Finally, it is an object to provide aircraft boundary layer control means of the aforementioned character which is simple and convenient to install and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 2 is a top plan view of the rear portion of one wing, partially cut away to reveal the internal ducting;

FIGURE 3 is an enlarged sectional view taken on the line 3—3 of FIGURE 2;

FIGURE 4 is an enlarged sectional view taken on the line 4—4 of FIGURE 2; and

FIGURE 5 is an enlarged sectional view taken on the line 5—5 of FIGURE 2.

Similar characters of reference indicate similar or identical elements and portions throughout the specification and throughout the views of the drawing.

Figure 1:
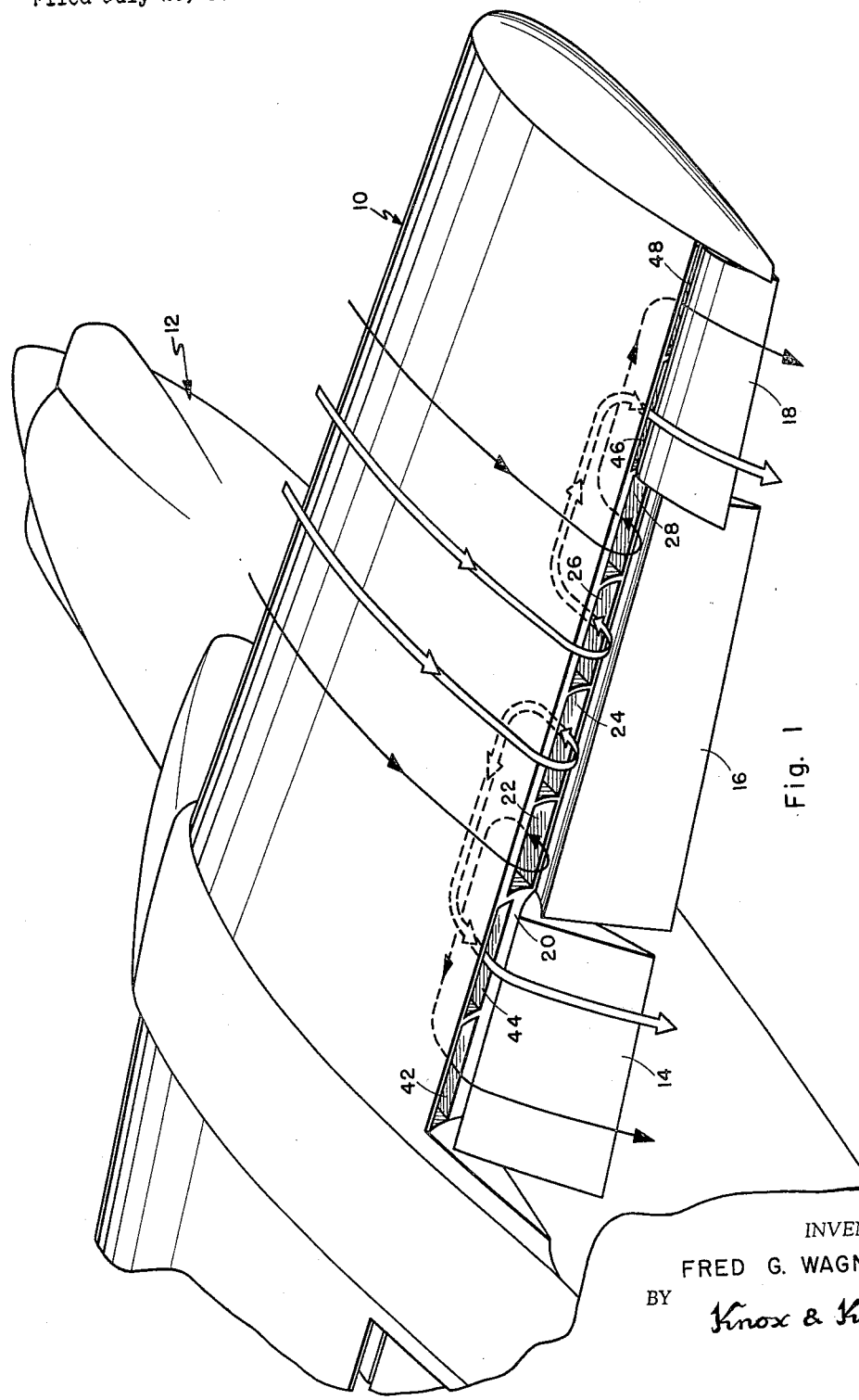
FIGURE 1 is a perspective view of a portion of an aircraft, showing the airflow pattern through the boundary layer control system.

The boundary layer control system is installed in the rear portion of each wing 10 of an aircraft, indicated generally at 12 in FIGURE 1, the position, shape and general structure of the wings being unimportant. The trailing edge portion of the wing 10 is composed of the control surfaces, which include an inboard blown flap 14, an intermediate suction flap 16 and an outboard blown aileron 18. On certain aircraft such as deltas, canards, or tailless types, spoilers and elevons may be used, but the boundary layer control system is equally applicable.

The rear of the wing structure immediately forwardly of the control surfaces is enclosed by a rear wall 20, in which are various slots through which the boundary layer control air passes. Arranged spanwise forwardly of the suction flap 16 are two pairs of inlet slots 22, 24 and 26, 28 opening into ducts 32, 34 and 36, 38 respectively. The duct 32 leads to an outlet slot 42 at the inboard end of blown flap 14 and the duct 34 leads to an outlet slot 44 at the outboard end of said blown flap, the outlet slots being positioned to eject air over the upper surface of the flap when lowered, as in FIGURE 3. To achieve this arrangement, the ducts 32 and 34 must overlap and be coextensive to some extent and may be tapered from front to rear to fit within the wing contours and connect with the appropriate slots. The duct arrangement illustrated is merely one example of how the overlapping with staggered inlet and outlet slots may be accomplished. Various other methods, such as diagonally divided composite ducts, one duct passing forwardly of the other, or some such configuration, may be utilized according to the available space and required flow characteristics.

The primary factor is the extension of each duct from its inlet to a remote outlet, rather than to the nearest adjacent outlet, so that each duct has a considerable length of air passage, the specific manner in which the overlapping is accomplished being secondary. Further, the installation is not restricted to pairs of inlets, outlets and ducts, but each slotted portion may be divided into any suitable number of individually ducted portions, each duct having considerable length by extending from one inlet to a remote outlet.

In a similar manner, the duct 36 leads from inlet slot 26 to an outlet slot 46 at the inboard end of the aileron 18 and the duct 38 leads to an outlet slot 48 at the outboard end of said aileron, the ducts being overlapped as described above and each having considerable length. The outlet slots 46 and 48 are positioned near the upper surface of the wing to eject air over the upper surface of aileron 18.

Inside each of the ducts 32 to 38 is a jet pump assembly 50 positioned adjacent the inlet end and having a plurality of nozzles 52 directed along the duct toward the outlet end. The spanwise portion of each duct between inlet and outlet is substantially straight and constitutes a jet pump portion 54, the overlapped arrangement of ducts providing a considerable length of each duct usable as a jet pump. The jet pump assemblies 50 are all fed from a supply pipe 56 leading from a gas generator 58, which can be installed in any suitable position in the aircraft. The gas generator can be a tap from a jet engine, an engine driven compressor, a supply of pressurized gas, or even a supply of combustible fuel which is burned in the ducts if temperature restrictions are not limiting.

In operation, the nozzles 52 provide a primary gas flow along the ducts to their respective outlets, the well known jet pump effect causing secondary air to be drawn in through the inlet slots 22 to 28. In an effective jet pump of this type the entrainment ratio of secondary air to primary flow is very high, and may be on the order of 10 to 1, or more, the primary flow required thus being small compared to the resultant total output flow. For a given efficiency, the number of nozzles required in the jet pump decreases with increased length of jet pump duct, so that a few nozzles, three being indicated, spread across the duct may be ample.

With the suction flap 16 lowered to expose the inlet slots, air is drawn from the upper surface of the wing 10, which at low speeds prevents stalling due to breakaway of the upper air flow. The air drawn into inlet slots 22 and 24 is boosted by the jet pump action and ejected through outlet slots 42 and 44 over the upper surface of the blown flap 14, which is also lowered in the low speed configuration, the effective lift of the wing being greatly increased according to well known aerodynamic principles. The air drawn into inlet slots 26 and 28 is similarly ejected through outlet slots 46 and 48 over the upper surface of aileron 18, greatly increasing the effect of the aileron whether in raised or lowered position for roll control.

For clarity the airflow path through one duct of each pair is indicated in solid line directional arrows, in FIGURES 1 and 2, while the flow through the other duct of each pair is indicated by open or double line directional arrows. In this manner, the flow along the length of the jet pump portions in the overlapping arrangement is readily apparent. Within the duct system the airflow is not subjected to any abrupt directional changes and the ducts can be designed to achieve a smooth efficient flow.

In contrast to this, the arrangement of prior systems can be compared to the connection of inlet slot 22 to the immediately adjacent outlet slot 44. Incoming air would be subjected to an abrupt reversal and the usable length of jet pump would be virtually non-existent. To increase the length of jet pump in such an arrangement would require the use of baffles in the duct, which would cause further losses in flow efficiency.

The sub-divided, staggered ducts with overlapping portions provide a maximum of jet pump length in a minimum of space and the entire system can be installed in a conventional type of wing aft of the rear spar, indicated at 60 for reference, in a portion of the wing which is relatively lightly stressed. The divided ducts have a further advantage in that the boundary layer control can be varied locally in selected areas. For example, in a multi-engined aircraft, the area immediately aft of the engine is in disturbed airflow and an increase in the effectiveness of boundary layer control in this area may be used to nullify the losses due to the disturbed flow. Other applications of variable flow will be apparent to those skilled in the art. The boundary layer control can be applied to flaps only if desired, although the blown aileron system is of considerable importance since aerodynamic control decreases at low speeds due to reduced airflow over the surfaces.

The structure illustrated is substantially diagrammatic, the specific structure and configuration of the control surfaces and slots being variable for different types of aircraft.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. A boundary layer control system for use in an aircraft wing having a wall extending between the upper and lower surfaces forwardly of the trailing edge thereof, and aerodynamic control surfaces hingedly mounted on said wing rearwardly of said wall, said boundary layer control system comprising: a plurality of inlet slots in said wall forwardly of one of said control surfaces; a plurality of outlet slots in said wall forwardly of another of said control surfaces; a duct from each of said inlet slots bypassing at least one adjacent slot and being connected with one of said outlet slots spaced a substantial distance therefrom; each of said ducts being thereby provided with an elongated jet pump portion; and jet pump means operatively mounted in said jet pump portions to provide primary gas flow in the direction of the outlet slots, ambient air being drawn into said inlet slots and ejected through said outlet slots.

2. A boundary layer control system for use in an aircraft wing having a wall extending between the upper and lower surfaces forwardly of the trailing edge thereof, and aerodynamic control surfaces hingedly mounted on said wing rearwardly of said wall, said boundary layer control system comprising: a plurality of inlet slots in said wall forwardly of one of said control surfaces; a plurality of outlet slots in said wall forwardly of another of said control surfaces; a duct connecting each of said inlet slots with one of said outlet slots remote therefrom; certain of said ducts having overlapping, coextensive portions; each of said ducts being thereby provided with an elongated, substantially straight jet pump portion; and jet pump means operatively mounted in said jet pump portions to provide primary gas flow in the direction of the outlet slots, ambient air being drawn into said inlet slots and ejected through said outlet slots.

3. A boundary layer control system for use in an aircraft wing having a wall extending between the upper and lower surfaces forwardly of the trailing edge thereof, and aerodynamic control surfaces hingedly mounted on said wing rearwardly of said wall, said boundary layer control system comprising: a plurality of inlet slots in said wall extending spanwise of the wing forwardly of one of said control surfaces; a corresponding number of outlet slots in said wall forwardly of other of said control surfaces; a plurality of ducts in said wing; each of said ducts connecting one of said inlet slots to one of said outlet slots remote therefrom; certain of said ducts having overlapping, coextensive portions; each of said ducts being thereby provided with an elongated, substantially straight jet pump portion; and jet pump means operatively mounted in said jet pump portions to provide primary gas flow in the direction of the outlet slots, ambient air being drawn into said inlet slots and ejected through said outlet slots.

4. A boundary layer control system for use in an aircraft wing, having a wall extending between the upper and lower surfaces forwardly of the trailing edge thereof; and a plurality of aerodynamic control surfaces including a suction flap and a blown flap hingedly attached to said wing rearwardly of said wall; said boundary layer control system comprising: a plurality of inlet slots in said wall forwardly of said suction flap; a corresponding number of outlet slots in said wall forwardly of said blown flap; a plurality of ducts in said wing; each of said ducts connecting one of said inlet slots with one of said outlet slots remote therefrom; certain of said ducts having overlapping, coextensive portions; each of said ducts being thereby provided with an elongated, substantially straight jet pump portion; jet pump means operatively mounted in said jet pump portions and directed to provide primary gas flow toward said outlets; and gas generating means coupled to said jet pump means, whereby, when said suction and blown flaps are lowered to expose said slots, ambient air is drawn into said inlet slots and ejected from said outlet slots over the surface of said blown flap.

5. A boundary layer control system for use in an aircraft wing, having a wall extending between the upper and lower surfaces forwardly of the trailing edge thereof; and a plurality of aerodynamic control surfaces including an inboard blown flap, an intermediate suction flap and an outboard attitude control surface hingedly attached to said wing rearwardly of said wall; said boundary layer control system comprising: a plurality of inlet slots in said wall forwardly of said suction flap; a corresponding total number of outlet slots in said wall forwardly of said blown flap and said attitude control surface; a plurality of ducts in said wing; each of said ducts connecting one of said inlet slots with one of said outlet slots remote therefrom; certain of said ducts having overlapping, coextensive portions; each of said ducts being thereby provided with an elongated, substantially straight jet pump portion; jet pump means operatively mounted in said jet pump portions and directed to provide primary gas flow toward said outlets; and gas generating means coupled to said jet pump means, whereby, when said suction and blown flaps are lowered to expose said slots, ambient air is drawn into said inlet slots and ejected from said outlet slots over the surface of said blown flap and said attitude control surface.

6. A boundary layer control system for use in an aircraft aerodynamic surface having at least one control surface operatively mounted at the trailing edge thereof, said boundary layer system comprising:
a plurality of air inlets in said aerodynamic surface; a plurality of outlet slots immediately forwardly of said control surface to direct boundary layer flow over the control surface; a duct from each of said inlets bypassing at least one adjacent slot and being connected with an outlet slot separated a substantial distance therefrom; each of said ducts being thereby provided with an elongated jet pump portion; and jet pump means operatively mounted in said jet pump portions to provide primary gas flow in the direction of the outlet slots, ambient air being drawn into said inlets and ejected through said outlet slots.

7. A boundary layer control system for use in an aircraft aerodynamic surface having at least one control surface operatively mounted at the trailing edge thereof, said boundary layer system comprising: a plurality of air inlets in said aerodynamic surface; a plurality of outlet slots immediately forwardly of said control surface to direct boundary layer flow over the control surface; a duct connecting each of said inlets with an outlet slot remote therefrom; said ducts having overlapping, coextensive portions and each of said ducts thereby being provided with an elongated jet pump portion; and jet pump means operatively mounted in said jet pump portions to provide primary gas flow in the direction of the outlet slots, ambient air being drawn into said inlets and ejected through said outlet slots.

References Cited in the file of this patent

UNITED STATES PATENTS

| | | |
|---|---|---|
| 2,890,843 | Attinello | June 16, 1959 |
| 3,012,740 | Wagner | Dec. 12, 1961 |